United States Patent [19]
Chappellier

[11] 3,951,110
[45] Apr. 20, 1976

[54] ROTARY ENGINE ARRANGEMENT
[76] Inventor: Robert A. Chappellier, 22 E. 80th St., New York, N.Y. 10021
[22] Filed: Dec. 6, 1974
[21] Appl. No.: 530,179

[52] U.S. Cl............................ 123/8.33; 123/8.41
[51] Int. Cl.² .................................... F02B 53/08
[58] Field of Search.............. 123/8.23, 8.25, 8.41, 123/8.43, 8.33; 418/184, 268, 230, 231, 232

[56] References Cited
UNITED STATES PATENTS

| 1,745,682 | 2/1930 | McAssey | 123/8.43 |
| 1,790,256 | 1/1931 | Wright | 123/8.17 |
| 1,877,250 | 9/1932 | Meyer | 123/8.41 |
| 2,070,606 | 2/1937 | Lickfeldt | 123/8.41 |
| 2,100,267 | 11/1937 | Potthast | 418/230 |
| 2,818,839 | 1/1958 | Voigt | 123/8.23 |
| 3,489,126 | 1/1970 | Regar | 418/232 |

Primary Examiner—Carlton R. Croyle
Assistant Examiner—O. T. Sessions
Attorney, Agent, or Firm—Eldon H. Luther

[57] ABSTRACT

A rotary internal combustion engine wherein the compression and the power functions are produced by a single rotor with the compression function being achieved by means of vanes that move longitudinally of the axis of rotation of the rotor and cooperate with complimentary recesses and with the power function being achieved by means of members that move laterally of said axis of rotation and cooperate with the periphery of the stator.

9 Claims, 7 Drawing Figures

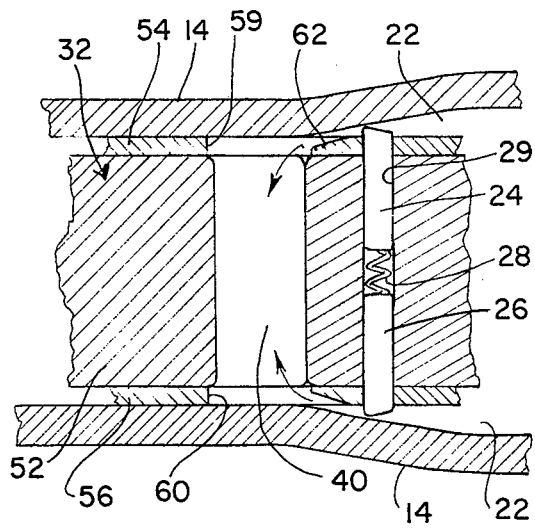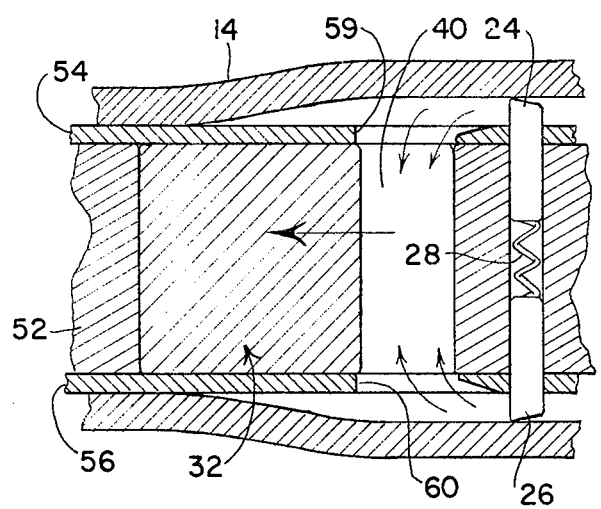
FIG. 4  FIG. 3
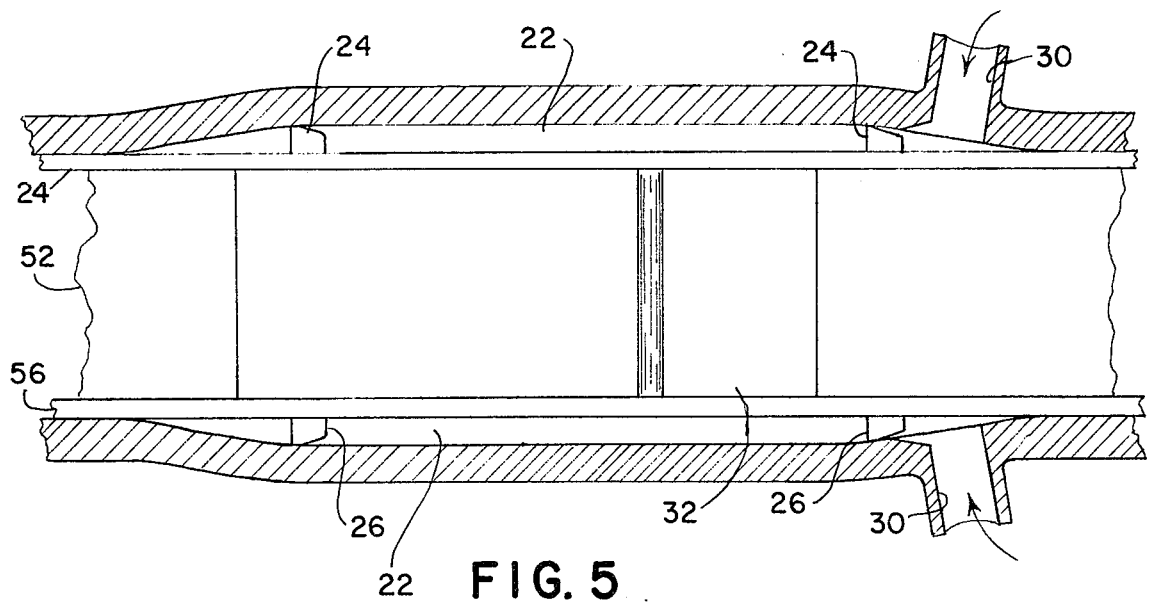
FIG. 5

ROTARY ENGINE ARRANGEMENT

BACKGROUND OF THE INVENTION

Numerous designs of rotary internal combustion engines have been proposed which utilize a rotor which is effective to perform the compression and the power functions of the engine. The present invention is directed to this type of arrangement with there being provided an improved design which is of simple construction and efficient in its operation. The invention utilizes power members that move laterally outward and inward of the rotor to follow the inner peripheral wall of the stator, with these members having compression pockets into which a compressed gas charge is conveyed. These members are self-actuating through the effect of the compressed gas charge and as a result of centrifugal force. The compression function takes place through the action of vanes which cooperate with arcuately disposed recesses. These vanes and recesses are positioned on opposite sides of the rotor to provide for a balanced force on the rotor and for moving the compressed gas charge to the pockets or recesses of the laterally moving members from opposite sides of the same. With the arrangement of the invention the motion of gases with respect to their containing surfaces is limited to a low value with there being a minimal dead gas pocket and no extended gas passages.

BRIEF DESCRIPTION OF THE INVENTION

In accordance with the invention there is provided a stator within which is rotatably journaled a rotor such that an expansion chamber of predetermined circumferential extent is formed between the outer peripheral surface of the rotor and the inner peripheral surface of the stator. A compressed gas charge is formed through the action of vanes that are slideably mounted in the rotor for moving in a direction generally longitudinally of the rotor axis. These vanes are biased laterally outward and they cooperate with circumferential recesses formed in the end walls or heads of the stator to produce a compressed gas charge as the rotor rotates about its axis. Immediately forward of each set of vanes is a laterally movable member mounted in the rotor and sealingly engaging the inner peripheral wall of the stator. In operation of the engine each of these members is urged laterally outward and each has a compression pocket for receiving the compressed gas charge produced by the vanes with this charge being fired as the laterally moving member enters the expansion chamber where the necessary moment for rotating the rotor is produced.

The vanes are effective to compress the gas charge on their forward side and to draw a fresh charge into the arcuate recesses on their rearward side as the rotor rotates. The compressed gas charge is forced into the compression pocket of the laterally movable members which then enter the expansion chamber and move radially outward thereinto with the charge being fired. The spent gases that occupy the space forwardly of the laterally movable member in the expansion chamber are forced out through the exhaust passage that communicates with this chamber at the rearward region thereof.

DESCRIPTION OF THE DRAWINGS

FIG. 3 is a detailed sectional view showing the disposition of the parts of the rotor and the stator as the compression function is nearing its end;

FIG. 4 is a view similar to that of FIG. 3 with the rotor being in a position somewhat further along in its direction of rotation;

FIG. 5 is a detailed sectional view taken generally along the arc 5—5 of FIG. 1 through the full extent of a pair of compression chambers;

DETAILED DESCRIPTION OF THE INVENTION

Figure 1:
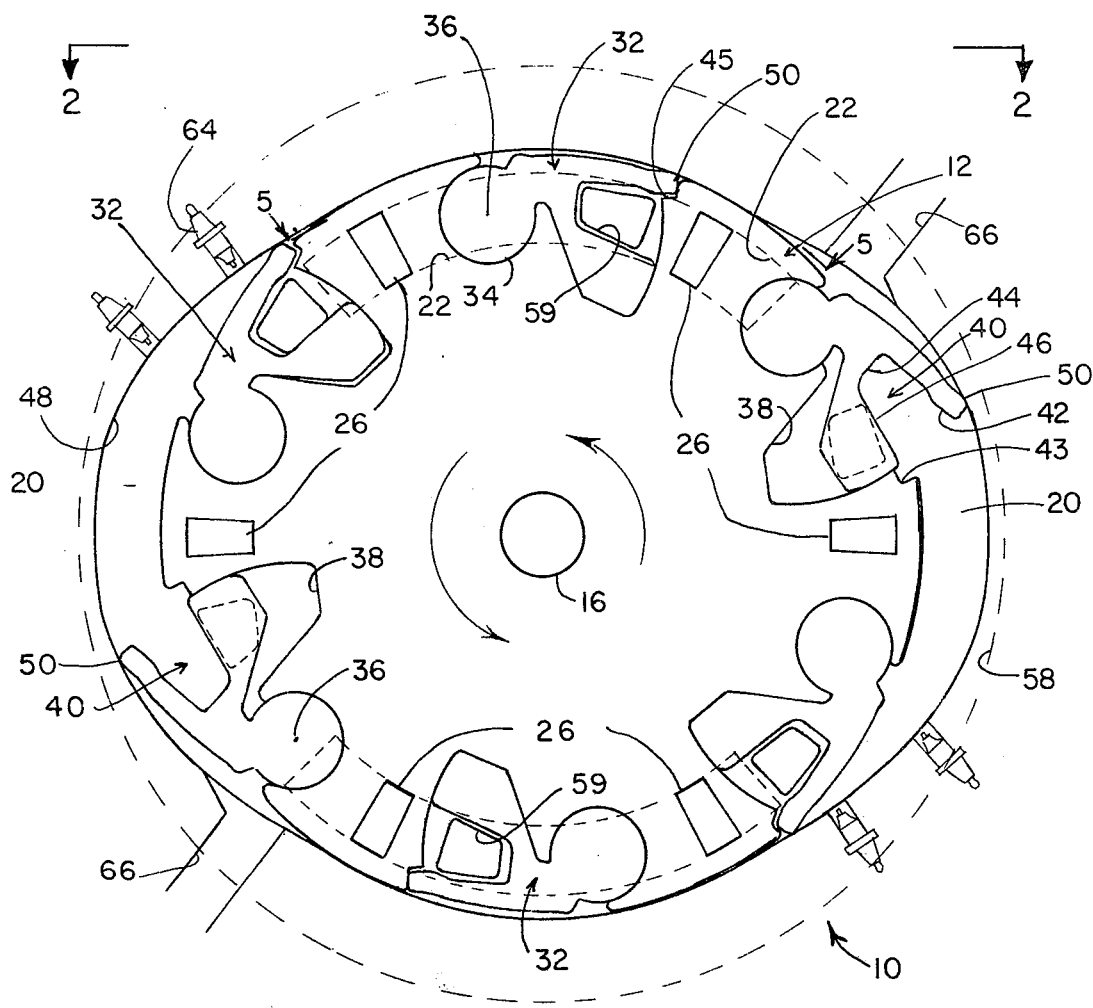
FIG. 1 is in the nature of a transverse sectional view through the rotary internal combustion engine of the invention in a plane generally normal to the axis of rotation of the rotor with the rotor portions being shown in elevation.

Referring now to the drawings, wherein like reference characters are used throughout to designate like elements, the illustrative and preferred embodiments of the invention depicted therein include the stator 10 within which is mounted the single rotor 12 with the rotor being journaled in the end walls or heads 14 of the stator and with the rotor having a support shaft 16 which extends through these end walls for this purpose.

This rotor is a right circular cylinder and the inner peripheral wall of the stator 10 is so shaped as to form therewith the oppositely disposed expansion chambers 20. The stator is made up of cylinder 18 secured between end walls or heads 14. Compression chambers are formed in the end walls or heads 14 of the stator on each side of the rotor with there being illustrated two complementary pairs of such chambers identified as 22 and shown in dotted lines in FIGS. 1 and 2. The chambers 22 are arcuate as shown and the compression function is achieved by means of vanes 24 and 26, which make up a vane pair, that cooperate with these chambers. These vanes are carried by rotor 12, being slidably received in complementary lateral recess 29 therein and they are outwardly biased by means of spring 28. The forward and rearward ends of the arcuate compression chambers 22 are tapered, as best shown in FIG. 5, to provide for smooth movement of the vanes to and from these chambers. The outer ends of the vanes will sealingly engage the walls of the compression chambers 22 with suitable seals (not shown) being provided for this purpose. Gas, such as air, or a mixture of air and vaporized fuel is admitted to each of the compression chambers 22 at their forward end through the inlet 30, FIG. 5.

The power function is produced through the action of the laterally movable piston members 32 with there being one such member mounted in the rotor immediately forward of each pair of vanes 24 and 26. In the FIGS. 1 through 5 embodiment, the members 32 are pivotally secured to the outer region of the rotor and for this purpose each member has a cylindrical forward portion 34 that is received within a complementary cylindrical recess in the rotor so as to pivot about the axis 36. The rearward portion of member 32 is formed as shown in FIG. 1 and when pivoted to its innermost position (clockwise as viewed in FIG. 1), is received within the complementary recess 38 in the rotor. This rearmost portion has a compression pocket or recess 40 which is open in a rearward direction. The pocket is formed by outer wall 42, end wall 44 and inner wall 46. The outermost region or surface of the member 32 is formed that the member engages the inner peripheral surface 48 of the stator 10 at its rearward extremity, identified as 50, with this engagement providing an effective seal between the member and the stator. It will be observed that the dimension of the outer wall 42 is greater than that of the inner wall 46 of the pocket 40 providing a greater area and the arrangement is such that even when the member 32 is in its innermost pivotal position, the pressure in pocket 40 acts over the full extent of this wall 42. There is thus provided a resultant force tending to pivot the member outwardly as the result of the development of pressure within the pocket, as by the receipt of the compression charge therein or the much greater pressure caused by the firing of a combustible charge within the pocket. This together with the outward bias produced by centrifugal force is sufficient to maintain member 32 in engagement with the peripheral wall of the stator throughout the full rotation of the rotor and provide proper operation of the engine.

Figure 2:
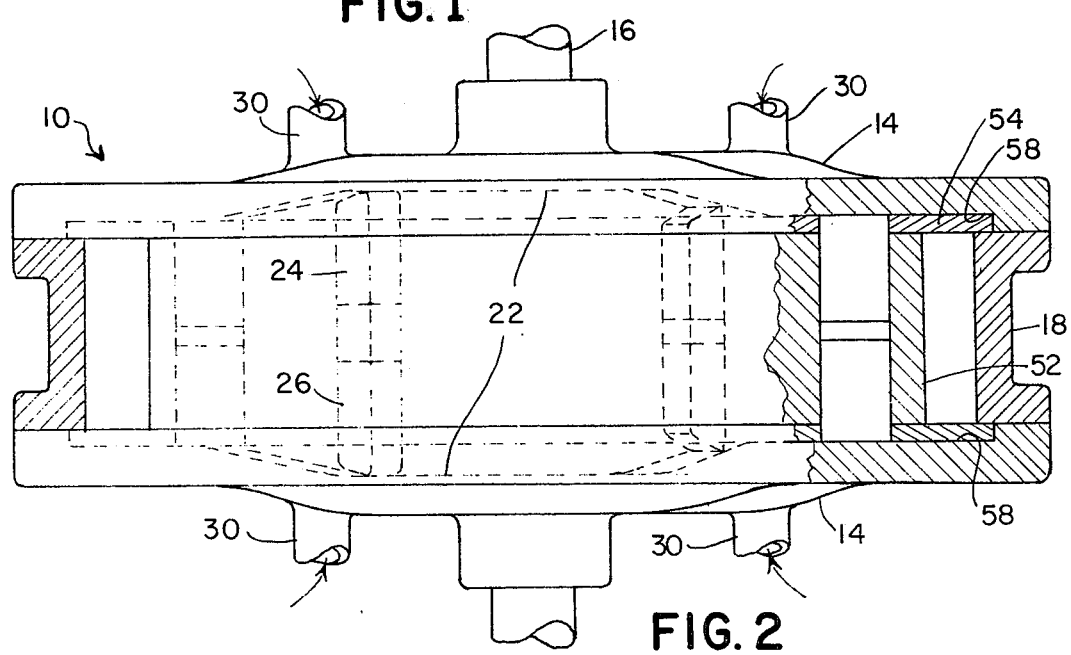
FIG. 2 is a view taken generally from line 2—2 to a FIG. 1 with portions being broken away to better show the details thereof.

The rotor 10 has a central portion 52 sandwiched between two sealing sideplates 54 and 56 as shown in FIGS. 2 and 4. These are all secured together so that they rotate in unison. The sideplates are received within recesses 58 formed in the heads 14 of the stator with these recesses being coaxial with the shaft 16 and extending radially outward beyond the expansion chamber 20. One such recess is shown in phantom in FIG. 1 and identified as 58. The cooperation between the outer region of these plates and the stator is effective to provide a seal between the rotor and the stator. The plates 54 and 56 are provided with openings 59 and 60 that communicate with the compression pockets 40 in laterally movable piston members 32 when the same are in their innermost position. The rearward portion at openings 59 and 60 is tapered as shown in FIGS. 3 and 4 to provide groove 62 to permit the admission into the compression pocket 40 of substantially the entire compressed gas charge in front of the vanes 24 and 26. This tapered region extends generally from the forward end of recess 29 within which the vanes are received in the rotor to the rearward region of the openings 58 and 60.

The purpose of plates 54 and 56 is to permit acceptable lateral sealing of the pivotal piston members 32. These members are sandwiched between the two plates so that the only relative motion between the plates and the members is the pivotal movement of the members whereby the sealing requirement may be readily achieved.

During the compressional cycle each vane of the vane pair 24 and 26 enters its respective chamber 22 via the tapered inlet of the chamber. After traversing the inlet passage 30 and after the immediately forward vane pair enter the tapered exit portion of the chamber, the vanes are effective to compress the gas charge in front of them and to suck in a fresh charge through intake 30 in back of them. During this compression action, the compression pocket 40 in the laterally movable member 32 immediately in front of the vane pair is in communication with the compression chambers 22 through the openings 59 and 60 to receive the compressed gas charge. As the vane pair 24 and 26 reach the rearward end of the compression chambers 22 and are cammed up the tapered rearward or exit surface to their innermost position, the compressed gas charge is contained substantially entirely within the compression pocket 40 with the tapered passageways 62, as hereinbefore mentioned, permitting the conveyance of the last portion of the compressed charge into this pocket. Only the portion of the charge located within the openings 59 and 60 will be contained in a dead space.

In operation of the FIGS. 1 through 5 embodiment, the rotor is rotated in the direction indicated by the arrows and as a result of this rotation, as each pair of vanes 24 and 26 traverse their respective compression chambers 22 they are effective to provide a compressed gas charge on each side of the rotor that is conveyed and directed to the compression pocket 40 of the laterally movable member 32 located immediately in front of the pair of vanes. At this time the laterally movable piston member 32 is in its innermost position and upon further rotation it moves laterally outward into the expansion chamber 20. At the beginning of the expansion chamber the charge within the compression part pocket 40 is ignited by suitable means such as sparkplug 64. By providing additional spark plugs 64 rearward of the initial ignition position, a second ignition can take place after the gases have partially burned and the combustible mixture has become more lean. The charge is combustible either by a combustible mixture being drawn through the intake passage 30 or by means of injecting fuel into the compressed gas charge in the pocket 40. As a result of firing this charge the gas rapidly expands and as the member 32 traverses the expansion chamber 20 and pivots to its outermost position, maximum moment is applied to the rotor. Member 32 is effective to force spent combustion gases in the region immediately in front of it out the exhaust port 66 at the rearward end of the expansion chamber as the member traverses the expansion chamber.

In the arrangement disclosed there are two compression and power cycles for each revolution of the rotor with the arrangement being symmetrical to provide for a balanced application of forces to the rotor.

In FIG. 5 it will be noted that the circumferential extent of the compression chambers 22 and the disposition of the pairs of vanes 24 and 26, i.e. their circumferential spacing, is such that one pair reaches the end of the inclined entrange region of the compression pocket as the next forward pair is entering the inclined exit region of the pocket so that maximum efficiency is achieved insofar as concerns the vanes producing a compression action.

Figure 6:
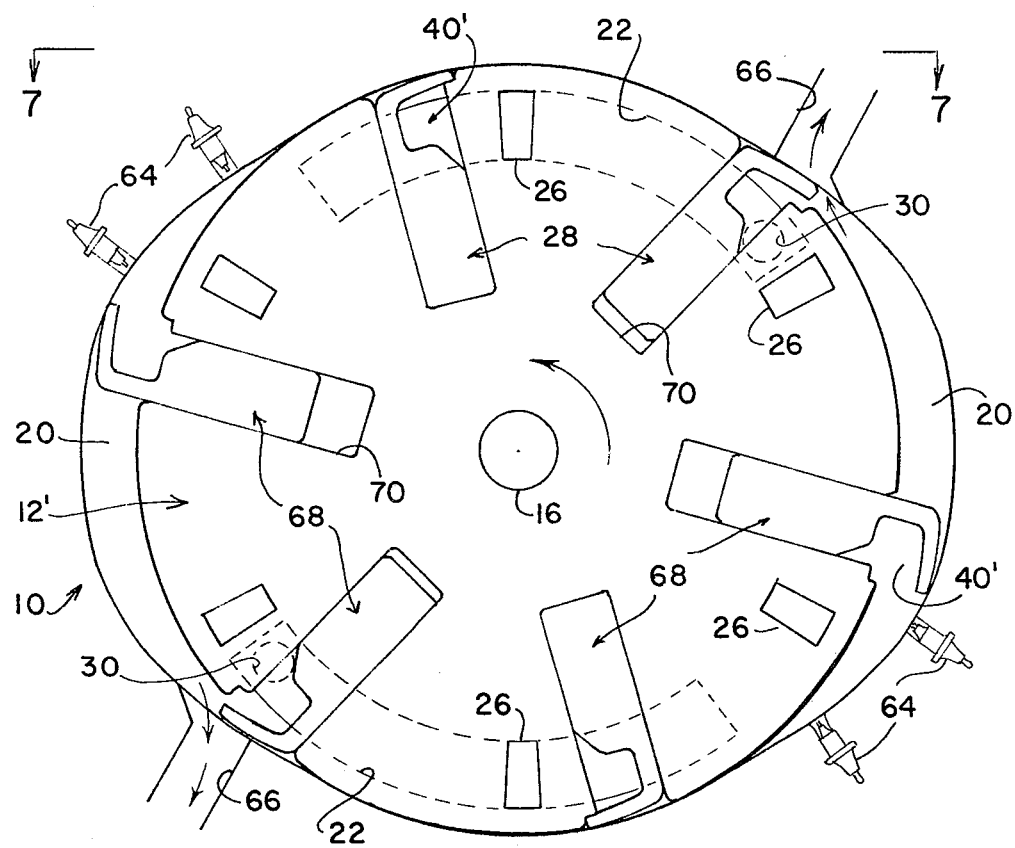
FIG. 6 is a view similar to that of FIG. 1 but showing a modified embodiment of the invention.
Figure 7:
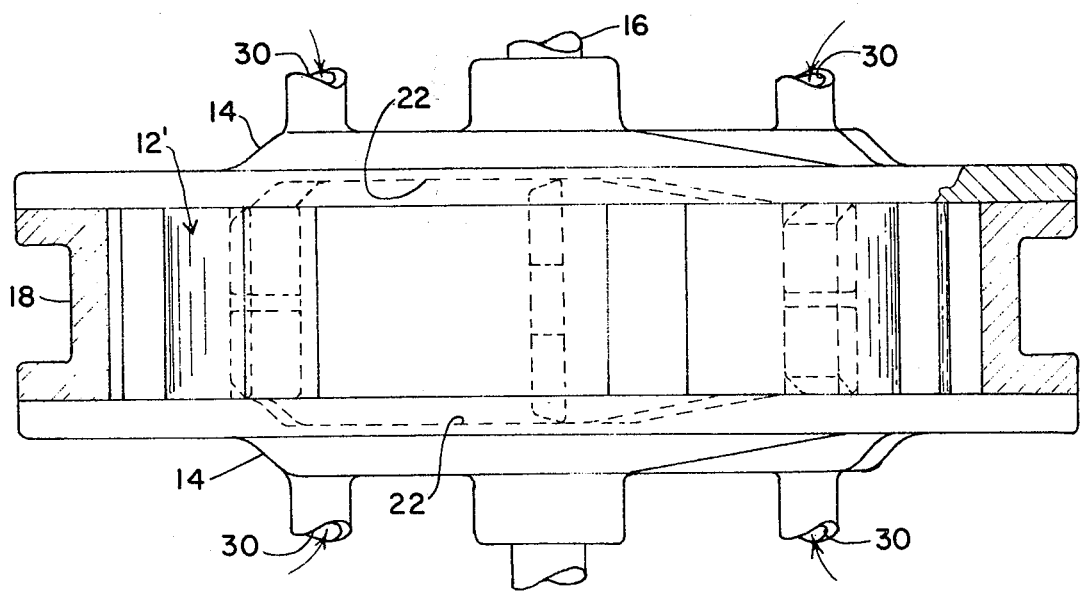
FIG. 7 is a view taken generally from line 7—7 of FIG. 6 with portions being broken in a way to show details.

In the embodiments of FIGS. 6 and 7, the laterally movable piston members, identified generally as 68, take a substantially different form than in the FIGS. 1 through 5 embodiment. These members 68 are slideable received in complementary recesses 70 in the rotor. However, other than sliding laterally in recesses 70 rather than pivoting about an axis these members 68 function in a same manner as the members 32. Piston members 68 engage the inner peripheral wall of the stator at the rearmost outer extremity of the members and receive the compressed gas charge in the rearwardly directed compression pocket 40'. For this purpose the outer region of the rear wall of recesses is tapered on both sides to provide a groove similar to groove 62 of the FIGS. 1 through 5 embodiment. The pocket 40' has relative dimensions similar to those of the pocket 40 so as to produce an outwardly directed resultant force as the result of compressed gas being received therewithin. In the FIGS. 6 and 7 embodiment, sealing plates 54 and 56 are not required as with the pivotal laterally movable members 32 so that the rotor 12' may be one piece rather than a three piece laminate. The member 68 may be provided with suitable seals which will give proper operation of the engine. Piston members 68 and 32 move relatively freely in and out of their complementary recess in the rotor and for this purpose suitable bleed passages may be provided to eliminate pumping action or vacuum formation at the radially inward portion of the recess.

The FIGS. 6 and 7 embodiment operates in the same manner as the FIGS. 1 through 5 embodiment.

It should be noted that this design can be used in other configuration such as large diameter engines with multiple compression and expansion chambers and vane pairs-arrangements wherein the stator revolves around a stationary rotor.

It will be understood that detail such as firing, lubrication, timing and sealing arrangements are not shown since any of a variety of ways of accomplishing these functions, well known to persons skilled in the art, may be employed for satisfactory operation of the present invention.

What I claim is:

1. A rotary internal combustion engine comprising in combination,
   a. a stator having an inner peripheral wall;
   b. a rotor disposed within said stator for rotation about a predetermined axis in a predetermined direction having an outer peripheral wall;
   c. said rotor and stator being shaped relative to each other to provide expansion and compression chambers with the expansion chambers being disposed radially between the rotor and the stator while the compression chambers are positioned laterally on opposite sides of the rotor;
   d. each of the compression chambers having an inlet for gas at the forward end relative to rotation of the rotor;
   e. pairs of vanes mounted within suitable laterally extending recesses in the rotor at predetermined circumferentially spaced locations;
   f. means for biasing these vanes outwardly into the compression chambers with the compression chambers being shaped relative to the vanes such that as the rotor rotates in said predetermined direction it is effective to compress a gas charge before it and to draw gas into the chamber in back of it through the inlet;
   g. piston members mounted in the rotor in number and space relation similar to the vane pairs with there being one such piston member disposed immediately in front of each vane pair, the piston members being urged radially outwardly of said axis into engagement with said inner peripheral wall of the stator during operation of the engine;
   h. each such piston member having a rearwardly directed recess so dimensioned that a pressurized gas in the recess produces a resultant outwardly directed force to urge the member into engagement with the stator wall;
   i. the construction of the rotor and the stator being such that as the compression vanes reach the end of the compression chamber the compressed gas charge in front thereof is forced into the adjacent recess of the piston member;
   j. means for firing the compressed gas charge received in the compression pocket of the piston member; and
   k. exhaust means for exhausting the spent gas charge from the expansion chamber.

2. A rotary internal combustion engine as defined in claim 1 wherein the rotor is substantially cylindrical and the stator is shaped to form the compression chambers between the outer peripheral wall of the rotor and the inner peripheral wall of the stator radially outward thereof.

3. A rotary internal combustion engine as defined in claim 1 wherein the end walls of the rotor are closely adjacent the end walls of the stator, and wherein said compression chambers comprise arcuate recesses of predetermined length with which the laterally biased vanes cooperate.

4. A rotary internal combustion engine as defined in claim 3 wherein the recess in each of the piston members mounted in the rotor is disposed with respect to the axis of rotation of the rotor so as to communicate with the arcuate recesses in the end walls of the stator when said member is in its innermost position.

5. A rotary internal combustion engine as defined in claim 4 wherein the arcuate recesses in the stator end wall have a gradual taper from the inner surface of the end wall to the full depth of the recess at both the forward and rearward end of the recess relative to rotation of the rotor and wherein the rotor has angular grooves in its sidewalls extending from a location adjacent to the vanes forwardly to the location of the piston members to permit the final portion of the compressed gas charge to be conveyed to the recesses of the piston members.

6. A rotary internal combustion engine as defined in claim 1 wherein the piston members are pivoted to the rotor proper about their forward end relative to the rotation of the rotor with their distal end relative to such rotation being in sealing engagement with the inner peripheral wall of the stator and wherein these pivotal members are sandwiched between sealing plates provided on each end of the rotor and forming a part of the rotor with the sealing plates having openings that communicate with the rearwardly directed recess in said piston members when they are in their innermost position.

7. A rotary internal combustion engine as defined in claim 6 wherein the rearwardly directed recess in each of said members has a greater outwardly directed wall area than inwardly directed wall area so that the force produced in said members from compressed gas within said pocket has an outwardly directed resultant tending to pivot members about their axis and into engagement with the inner peripheral wall of the stator.

8. A rotary internal combustion engine as defined in claim 1 wherein said piston members are slidably received within complementary recesses formed in the rotor proper and wherein said piston members sealingly engage the stator at their rearward extremity.

9. A rotary internal combustion engine as defined in claim 1 wherein each vane pair comprises two vanes mounted in a single lateral recess in the rotor with one vane projecting from each side of the rotor and wherein the compression chambers in the respective walls of the stator on each side of the rotor are in the same respectively circumferential location whereby vanes of each pair are effective to simultaneously produce a compression function.

* * * * *